(12) United States Patent
Kruglick (10) Patent No.: US 8,812,681 B2
(45) Date of Patent: Aug. 19, 2014

(54) ADJUSTING THE QUALITY OF SERVICE BASED ON NETWORK ADDRESSES ASSOCIATED WITH A MOBILE DEVICE

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 161 days.

(21) Appl. No.: 13/262,825

(22) PCT Filed: Apr. 13, 2011

(86) PCT No.: PCT/US2011/032340
§ 371 (c)(1),
(2), (4) Date: Oct. 3, 2011

(87) PCT Pub. No.: WO2012/141701
PCT Pub. Date: Oct. 18, 2012

(65) Prior Publication Data
US 2012/0265898 A1    Oct. 18, 2012

(51) Int. Cl.
*G06F 15/16* (2006.01)
*G06F 15/173* (2006.01)

(52) U.S. Cl.
USPC ............ 709/226; 709/223; 709/224; 709/235

(58) Field of Classification Search
USPC .................. 709/203, 224, 226, 223, 235; 370/231.1, 310, 338, 230; 455/404.1, 455/414.1
See application file for complete search history.

(56) References Cited

U.S. PATENT DOCUMENTS

| | | | |
|---|---|---|---|
| 7,835,275 B1 | 11/2010 | Swan et al. | |
| 2005/0059397 A1 | 3/2005 | Zhao | |
| 2005/0221813 A1 | 10/2005 | Rajahalme et al. | |
| 2009/0034495 A1* | 2/2009 | Khijniak et al. | 370/338 |
| 2010/0034083 A1* | 2/2010 | Prakash et al. | 370/230.1 |
| 2010/0034124 A1* | 2/2010 | Payyappilly et al. | 370/310 |
| 2010/0099388 A1* | 4/2010 | Aaron et al. | 455/414.1 |
| 2010/0195503 A1 | 8/2010 | Raleigh | |
| 2011/0294456 A1* | 12/2011 | Anderson et al. | 455/404.1 |
| 2012/0084430 A1* | 4/2012 | Lu | 709/224 |
| 2012/0236713 A1* | 9/2012 | Kakadia et al. | 370/230 |

FOREIGN PATENT DOCUMENTS

WO    2006102462 A1    9/2006

OTHER PUBLICATIONS

Australia Patent Office, International Search Report and Written Opinion of the International Searching Authority for PCT/US2011/032340, prepared on Jul. 22, 2011, Australia.

Woodside, Murray and Daniel A. Mensace, Application-Level QoS, IEEE Internet Computing, May/Jun. 2006, pp. 13-15, published by the IEEE Computer Society.

Hosein, Patrick, Pricing for QoS-Based Wireless Data Services and its Impact on Radio Resource Management, Globecom Workshops (GC Wkshps), 2010 IEEE International Workshop on Management of Emerging Networks and Services, Dec. 6-10, 2010, pp. 539-544, Miami, Florida.

Skorin-Kapov, L. et al., Application-level QoS negotiation and signaling for advanced multimedia services in the IMS, IEEE Communications Magazine 45, No. 7 (2007): 108-116.

(Continued)

*Primary Examiner* — Quang N Nguyen
(74) *Attorney, Agent, or Firm* — Brundidge & Stange, P.C.

(57) ABSTRACT

Implementations and techniques for adjusting the quality of service on an application-by-application basis based at least in part on a plurality of network addresses associated with a given mobile device are generally discussed.

18 Claims, 6 Drawing Sheets

(56) References Cited

OTHER PUBLICATIONS

Fitzek, F., et al., Providing application-level QoS in 3 G/4 G wireless systems: a comprehensive framework based on multirate CDMA, IEEE Wireless Communications 9, No. 2 (2002): 42-47.

Koga, H. et al., A framework for network media optimization in multihomed QoS networks, in Proceedings of the 1st ACM workshop on Dynamic interconnection of networks (ACM, 2005), 42.

Jokela, P. et al., Host Identity Protocol: Achieving IPv4 oe IPv6 handovers without tunneling, 2003, accessed online via http://citeseerx.ist.psu.edu/viewdoc/download?doi=10.1.1.78.6361&rep=rep1&type=pdf on Oct. 4, 2011.

Pekka Nikander, Andrei Gurtov, and Thomas R. Henderson, "Host Identity Protocol (HIP): Connectivity, Mobility, Multi-Homing, Security, and Privacy over IPv4 and IPv6 Networks," IEEE Communications Surveys & Tutorials 12, No. 2 (2010): 186-204.

Host Identity Protocol, Wikipedia, last modified on Feb. 19, 2011, accessed online via http://en.wikipedia.org/wiki/Host_Identity_Protocol on Oct. 4, 2011.

Naghshineh, M. et al., End to end QoS provisioning multimedia wireless/mobile networks using an adaptive framework, IEEE Communications Magazine, Nov. 1997, vol. 35, No. 11, pp. 72-81.

Rojas, P., "The Engadget Interview: Jeffrey Citron, chairman and CEO of Vonage," posted on May 23, 2005, accessed at http://www.engadget.com/2005/05/23/the-engadget-interview-jeffrey-citron-chairman-and-ceo-of/, accessed on May 27, 2013.

Vaughn, A., "AT&T Blames iPhone "Data Hogs" for The Network Issues," posted on Dec. 9, 2009, accessed at http://appadvice.com/appnn/2009/12/att-blames-iphone-data-hogs-for-the-network-issues/, accessed on May 24, 2013.

Buchanan, M., "AT&T Just Killed Unlimited Wireless Data (and Screwed Everybody in the Process)," posted on Feb. 6, 2010, accessed at http://gizmodo.com/5553418/att-just-killed-unlimited-wireless-data-and-screwed-everybody-in-the-process, accessed on May 27, 2013.

Goldstein, P., "AT&T, Apple facing expanded lawsuit over iPad data rate changes," posted on Jun. 25, 2010, accessed at http://www.fiercewireless.com/story/t-apple-facing-expanded-lawsuit-over-data-rate-changes/2010-06-25, accessed on May 27, 2013.

Paul, I., "AT&T's New iPhone Data Plans: Pros and Cons," posted on Jun. 4, 2010, accessed at http://www.pcworld.com/article/197992/atts_new_iphone_data_plans_pros_and_cons.html, accessed on May 27, 2013.

Horwitz, J., "Editorial: New AT&T iPhone Data, Tethering Plans Equal Future Shock," Published on Jun. 2, 2010, accessed at http://www.ilounge.com/index.php/articles/comments/editorial-new-att-iphone-data-tethering-plans-equalfuture-shock/, accessed on May 27, 2013.

\* cited by examiner

500 A computer program product.

502 A signal bearing medium.

504 Machine-readable instructions, which, if executed by one or more processors, operatively enable a computing device to:

receive communication traffic from a given mobile device of the plurality of mobile devices, wherein a first and a second network address are associated with the given mobile device, wherein the communications traffic includes communications traffic from a first application associated with the first network address and a second application associated with the second network address; and/or     adjust the quality of service to the given mobile device on an application-by-application basis based at least in part on the first and second network addresses.

| 506 a computer-readable medium. | 508 a recordable medium. | 510 a communications medium. |

ADJUSTING THE QUALITY OF SERVICE BASED ON NETWORK ADDRESSES ASSOCIATED WITH A MOBILE DEVICE

BACKGROUND

Unless otherwise indicated herein, the approaches described in this section are not prior art to the claims in this application and are not admitted to be prior art by inclusion in this section.

Many factors may lead to congestion in wireless networks including excessive traffic bursting, overbooking, rerouting, ingress policing, and more. Such congestion may increase stress on both bandwidth and buffering which in turn may cause delays and increased data loss that may lead to link dropping. Furthermore, wireless networks are increasingly required to support mobile devices having non-telephonic functionality, such as mobile telephones equipped with Global Positioning System (GPS) functionality, electronic book readers, gaming consoles, and the like. Many of these devices (such as GPS trackers in particular) attempt to maintain network connections for large fractions of the time while sending relatively little data and may be expected to place increased bandwidth demands on wireless networks.

One factor that may contribute to congestion in wireless networks includes mobile device "tethering" (e.g., the use of a mobile device to provide internet access to additional devices). A few high impact users with tethering can dramatically impact bandwidth needs. Historically, wireless carriers have typically ignored users who tether but don't use up too much bandwidth. Alternatively, wireless carriers have begun to move to limited data plans and extra charges for tethering in order to prevent adverse impacts of such tethering.

SUMMARY

Some example methods, apparatus, and systems relate to adjusting the quality of service on an application-by-application basis based at least in part on a plurality of network addresses associated with a given mobile device.

Such methods may be implemented in a communication network associated with a plurality of mobile devices. Such methods may include receiving, via a mobile service provider portion of the communication network, communication traffic from a given mobile device of the plurality of mobile devices. A first network address and a second network address may be associated with the given mobile device. The communications traffic may include communications traffic from a first application associated with the first network address and a second application associated with the second network address. An adjustment of the quality of service to the given mobile device may be performed on an application-by-application basis based at least in part on the first and second network addresses.

Some example apparatus and systems related to adjusting the quality of service to a mobile device may be implemented in a mobile service provider configured to facilitate communication in a communication network among a plurality of mobile devices. Such a mobile service provider may be configured to receive communication traffic from a given mobile device of the plurality of mobile devices. A first and a second network address may be associated with the given mobile device. The communications traffic may include communications traffic from a first application associated with the first network address and a second application associated with the second network address. An adjustment of the quality of service to the given mobile device may be performed on an application-by-application basis based at least in part on the first and second network addresses.

Some methods may be implemented in a mobile device associated with a communication network. Such methods may include transmitting, from the mobile device, communication traffic to a mobile service provider portion of the communication network. A first and a second network address may be associated with the mobile device. The communications traffic may include communications traffic from a first application associated with the first network address and a second application associated with the second network address. The mobile device may receive a first quality of service for the first application and a different second quality of service for the second application from the mobile service provider. The first and second quality of service may be based at least in part on the first and second network addresses.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to adjusting the quality of service on an application-by-application basis based at least in part on a plurality of network addresses associated with a given mobile device.

Mobile service providers are in a tough position when it comes to allowing phone tethering. On one hand allow tethering may encourage user satisfaction and prevent subscriber churn, but at the same time a few high impact users can dramatically impact bandwidth needs. Mobile service providers have often ignored users who tether but don't use up too much bandwidth, but limited bandwidth combined with the increasing ubiquity of data-enabled mobile devices may result in mobile service providers utilizing limited data plans and/or extra charges for tethering in order to prevent the worst network scenarios. Low-impact users are likely to see this as highly annoying if they rarely use the tethering feature (e.g., once or twice a month while traveling), and it is unclear if tethering charges will result in an overall financial win considering the customer discontent and limited subscriptions that may result from such a policy. Further, such tethering charges may utilize application level quality of service management, which may potentially involve complex new routing infrastructure.

Some examples discussed below may allow mobile service providers to make better use of resources and/or capture available tethering subscription money while also providing a better experience to users. For example, resources that would otherwise go unused may be accessed by users of casual or light tethering to avoid alienating the occasional user. At the same time, guaranteed tethering may be provided to users who desire uninterrupted service.

While some examples are illustrated with respect to tethering policies, other policies can of course be used for address-level control of quality of service (e.g., on an application-by-application basis where such applications may be differentiated via a plurality of network addresses) based on criteria other than and/or in addition to tethering. For example, this sort of address-level gating could be used for a variety of high-bandwidth programs, allowing a mobile device to have free access to various applications at some times (e.g., at times of low congestion) and restricted access at other times (e.g., at times of high congestion).

Figure 1:
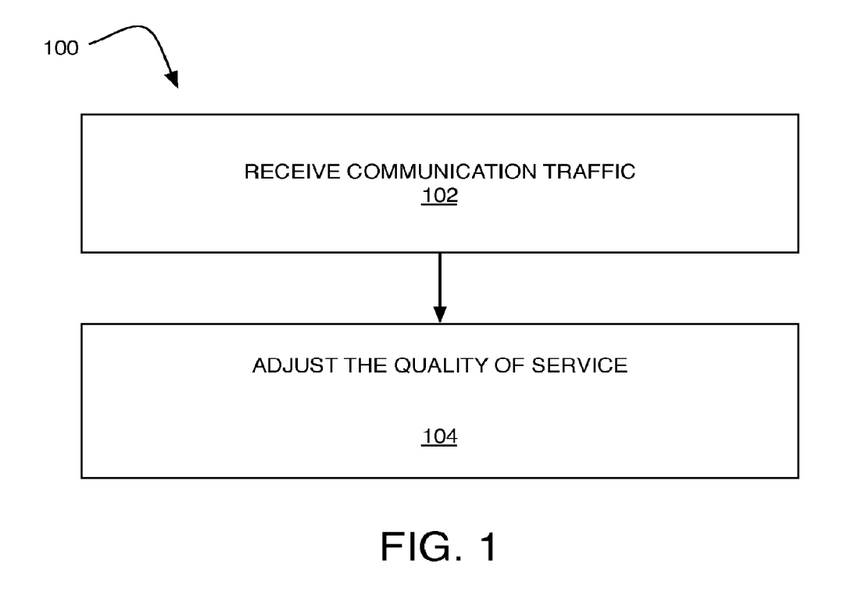
FIG. 1 illustrates an example process for adjusting the quality of service on an application-by-application basis based at least in part on a plurality of network addresses associated with a given mobile device that is arranged in accordance with at least some embodiments of the present disclosure.

FIG. 1 illustrates an example process for adjusting the quality of service on an application-by-application basis based at least in part on a plurality of network addresses associated with a given mobile device that is arranged in accordance with at least some embodiments of the present disclosure. Process 100, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 1 may be practiced in various implementations. For example, although process 100, as shown in FIG. 1, may comprise one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of functional operations as indicated by example operations 102 and/or 104.

As illustrated, process 100 may be implemented for adjusting the quality of service on an application-by-application basis based at least in part on a plurality of network addresses associated with a given mobile device. Process 100 may be implemented in a communication network associated with a plurality of mobile devices (see FIG. 2). Processing may begin at operation 102, "receive communications traffic", where communication traffic may be received via a mobile service provider. For example, communication traffic may be received via a mobile service provider portion of the communication network from a given mobile device of the plurality of mobile devices. The communications traffic may include communications traffic from a first application associated with a first network address and a second application associated with a second network address. For example, mobile service provider may associate the first and second network addresses with the first and second applications of the mobile device, respectively.

Processing may continue from operation 102 to operation 104, "adjust the quality of service", where the quality of service to the given mobile device may be adjusted. For example, an adjustment of the quality of service to the given mobile device may be performed on an application-by-application basis. In some examples, such an adjustment may be based at least in part on the first and second network addresses associated with the given mobile device.

For example, the adjusting of the quality of service may include assigning a first quality of service to the first application based at least in part on the first network address. Similarly, the adjusting of the quality of service may include assigning a second quality of service to the second application based at least in part on the second network address, where the first quality of service and second quality of service are different from each other.

In some examples, adjusting the quality of service to mobile device may be based at least in part on a ranking of the first and second network addresses and/or on network conditions of the communication network. Such a ranking may be a hierarchical-type ranking (e.g., a ranking arranged in a graded order), for example. As used herein the term "network conditions" may refer to traffic congestion, a given time period (e.g., during periods of the day were high traffic loads are historically common), statistical projections of usage, quality measures of a particular user's connection (e.g., via an error rate or the like), current or projected changes in network configurations, alarm messages, reservations, network maintenance, the like, or combinations thereof. In one example, the mobile service provider may access a table having a listing of various applications (e.g., email applications, message texting applications, mapping applications, web browsing applications, gaming applications and/or the like) where each application and/or group of applications may be associated with a ranking value and may be associated with a network address. For example, email applications and/or message texting applications might be associated with a ranking with a relatively high priority, while web browsing applications and/or gaming applications might be associated with another ranking with a relatively low priority. Additionally or alternatively, mobile service provider may associate non-tethered applications with one or more rankings with relatively high priority, and may associate tethered applications with one or more rankings with relatively low priority. Additionally or alternatively, a ranking value associated with each application and/or group of applications (e.g., associated via a network address) might be adjusted. For example, a ranking value might be adjusted based at least in part on purchased service subscriptions and/or the type of use that the application and/or group of applications are currently being used for (e.g., initial buffer building as opposed to maintaining a buffer).

Figure 2:
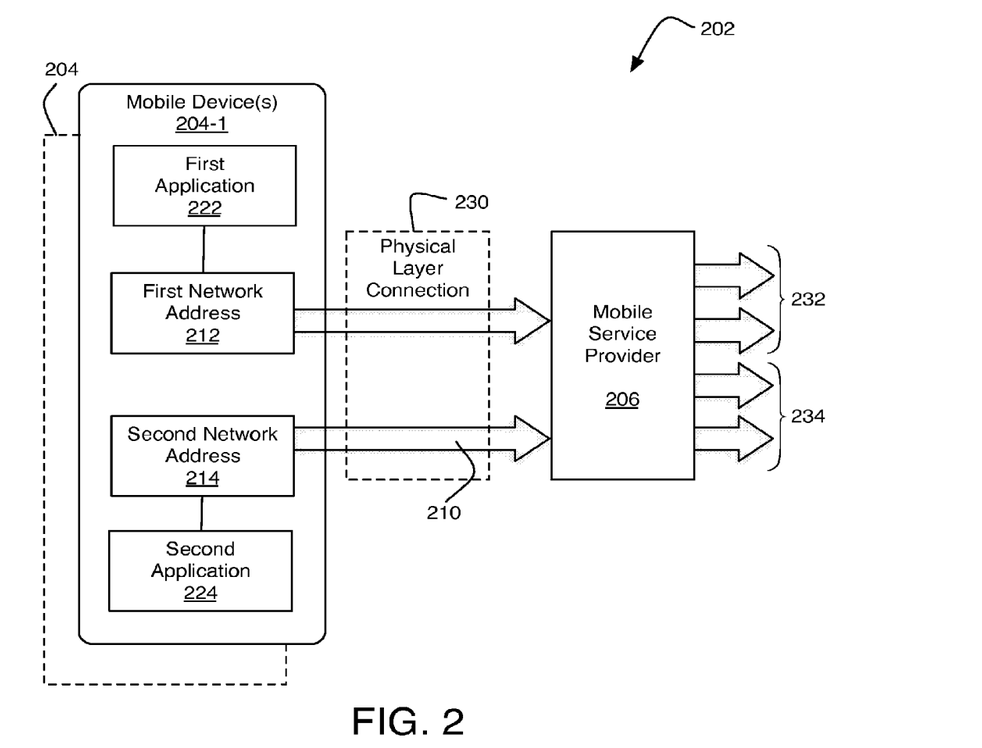
FIG. 2 is a block diagram of an illustrative embodiment of a communication network that is arranged in accordance with at least some embodiments of the present disclosure.

FIG. 2 is a block diagram of an illustrative embodiment of a communication network that is arranged in accordance with at least some embodiments of the present disclosure. As illustrated, communication network 202 may be implemented for routing communications via a plurality of mobile devices 204 and a mobile service provider 206.

As used herein the term "communication network" may refer to any number of communication systems including a plurality of mobile devices adapted for wireless communication with one another via the communication network. For example, such a communication network 202 may refer to any number of communication systems including one or more of the following: a cellular phone network, a mobile worldwide interoperability for microwave access network (WiMax), voice over Internet protocol (VoIP) system (e.g., via a wireless local area network (WLAN), a wireless wide area network (WWAN)), Long Term Evolution network (LTE), Orthogonal Frequency-Division Multiple Access network (OFDMA), the like, and/or combinations thereof, according to the particular application. Additionally or alternatively, such a communication network 202 may refer to any number of communication systems that provide Internet access to a plurality of mobile devices.

Communication network 202 may include one or more mobile devices 204, illustrated by dashed box 204. Mobile devices 204 may be arranged (e.g., coupled) in communication with mobile service provider portion 206 of communication network 202. As used herein the term "mobile device" may refer to mobile devices such as a cell phone, a personal data assistant (PDA), the like, and/or combinations thereof, for example.

As used herein the term "mobile service provider" may refer to a mobile service provider portion of communication network such as a central management center, a mobile phone network operator, or the like that is configured to facilitate communication among a plurality of mobile devices. Communication network 202 is presented herein purely for illustrative purposes and it may be recognized that communication network 202 may have additional components that have not been depicted in FIG. 2 in the interest of clarity. Accordingly, mobile service provider 206 may include any number of components of communication network 202 that are not illustrated here, such as one or more base stations, base station controller, mobile switching center, the like, and/or combinations thereof.

As illustrated, mobile service provider portion 206 may be configured to facilitate communication in communication network 202 among mobile devices 204. Such a mobile service provider 206 may be configured to receive communication traffic 210 from a given mobile device 204-1 of the plurality of mobile devices 204. A first network address 212 and a second network address 214 may be associated with mobile device 204-1. Communications traffic 210 may include communications traffic from a first application 222 associated with the first network address 212 and a second application 224 associated with the second network address 214.

An adjustment of the quality of service to a given mobile device (e.g., mobile device 204-1) may be performed on an application-by-application basis based at least in part on first network address 212 and second network address 214. For example, the adjusting of the quality of service may be based at least in part on a ranking of first network address 212 and second network address 214 as well as on network conditions of communication network 202.

In the illustrated example, communication traffic from first application 222 and second application 224 may be communicated via a single physical layer connection 230. Such a single physical layer connection 230 may be operable between a given mobile device (e.g., mobile device 204-1) and mobile service provider 206 portion of communication network 202.

As will be discussed in more detail below, in some examples, mobile service provider 206 may be configured to determine which of first application 222 and second application 224 are tethered. As used herein the term "tether" may refer to the use of a mobile device to provide Internet access to additional devices. For example, mobile service provider 204 may be configured to determine which first application 222 and second application 224 are tethered based at least in part on first network address 212 and second network address 214.

In some examples, mobile service provider 206 may optionally be configured to determine whether a service subscription is associated with those applications that are determined to be tethered. In such cases, the adjusting of the quality of service may include assigning a first quality of service 232 to those applications that are determined to be tethered and are associated with the service subscription. Similarly, the adjusting of the quality of service may include assigning a second quality of service 234 to those applications that are determined to be tethered and not associated with the service subscription, where the first quality of service 232 and second quality of service 234 are different from each other. Additionally or alternatively, mobile service provider 204 may optionally be configured to transmit a message to a given mobile device (e.g., mobile device 204-1) based at least in part on a determination that a service subscription is not associated with those applications that are determined to be tethered. Such a message may indicate that quality of service to those applications that are determined to be tethered have been adjusted, for example.

Some quality of service and/or availability-based bandwidth protocols may exist at the Media Access Control (MAC) or lower network levels from the point of view of mobile device 204-1. A user of mobile device 204-1 who is web browsing typically may experience lower loading speeds and may not know whether this is due to network congestion, poor reception, or poor web page design. Congestion typically may take the form of dropped calls or lower data rates, but may not be managed based on specific application usage. In the absence of the example illustrated by FIG. 2, different applications 222 and 224 may send traffic through shared ports and sockets associated with a single network address. From then onward, through the physical layer and network, such traffic may be merged and must be separated by ports or inferred usage profiles. Conversely, in the example illustrated by FIG. 2, different applications 222 and 224 may be associated with a different network address for each application (or group of applications) while still sharing the physical layer connection. In such an example, traffic may be identified in the header by a network address that indicates the associated application, and can be managed through ports based on such network addresses.

Figure 3:
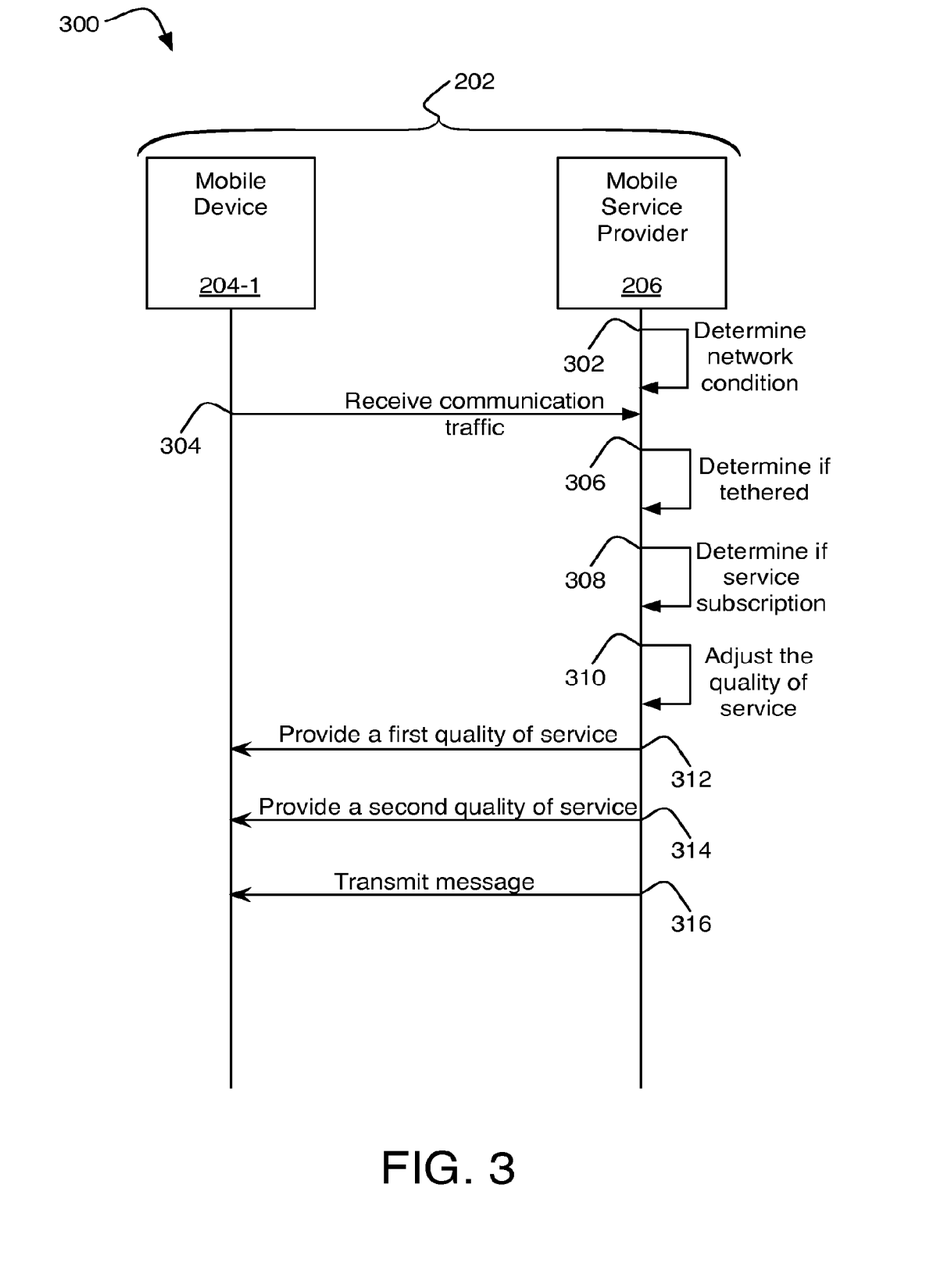
FIG. 3 illustrates another example process for adjusting the quality of service on an application-by-application basis based at least in part on a plurality of network addresses associated with a given mobile device that is arranged in accordance with at least some embodiments of the present disclosure.

FIG. 3 illustrates another example process for adjusting the quality of service on an application-by-application basis based at least in part on a plurality of network addresses associated with a given mobile device that is arranged in accordance with at least some embodiments of the present disclosure. Process 300 may include one or more of functional operations as indicated by example operations 302, 304, 306, 308, 310, 312, 314 and/or 316.

As illustrated, process 300 may be implemented for adjusting the quality of service on an application-by-application basis based at least in part on a plurality of network addresses associated with mobile device 204-1. Process 300 may be implemented in a communication network 202. Processing may begin at operation 302, "determine network condition", where mobile service provider 206 may determine the condition of communication network 202. For example, the network condition may include traffic congestion, and mobile service provider 206 may determine if communication network 202 is congested.

Processing may continue from operation 302 to operation 304, "receive communication traffic", where communication traffic may be received via mobile service provider 206. For example, communication traffic may be received via mobile service provider 206 from mobile device 204-1. The communications traffic may include communications traffic from a first application associated with a first network address and a second application associated with a second network address. For example, mobile service provider 206 may associate the first and second network addresses with the first and second applications of mobile device 204-1, respectively.

In some examples, the first and second network address may include Host Identity Protocol-type identifiers. As will be discussed in greater detail below, in some examples, tethered applications may be identified via such Host Identity Protocol-type identifiers.

Processing may continue from operation 304 to operation 306, "determine if tethered", where mobile service provider 206 may determine if either of the first and second application are tethered. For example, mobile service provider 206 may determine which of the first and second applications are tethered based at least in part on the first and second network addresses.

Processing may continue from operation 306 to operation 308, "determine if service subscription", where mobile service provider 206 may determine if a service subscription is associated with those applications that are determined to be tethered. For example, mobile service provider 206 may determine if a service subscription is associated with tethered applications based at least in part on the first and second network addresses. In such an example, data may be managed at the address level, and by linking the tethered applications to a common network address then all the tethered applications may be managed by managing the data going to that common network address.

Processing may continue from operation 308 to operation 310, "adjust the quality of service", where the quality of service to mobile device 204-1 may be adjusted. For example, the quality of service to mobile device 204-1 may be adjusted on an application-by-application basis by providing a first quality of service to the first address (which may be associated with a first application) and a second quality of service to the second address (which may be associated with a second application), where the first and second quality of service are different from each other.

As used herein the term "adjusting the quality of service" may include throttling or reducing the quality of service to mobile device 204-1 on an application-by-application basis (e.g., where such applications may be differentiated via a plurality of network addresses), shutting down the quality of service to mobile device 204-1 on an application-by-application basis, the like, and/or combinations thereof. As discussed above with respect to process 100, in some examples, adjusting the quality of service to mobile device 204-1 may be based at least in part on a ranking of the first and second network addresses and/or on network conditions of the communication network.

Processing may continue from operation 310 to operation 312, "provide a first quality of service", where a first quality of service may be provided to mobile device 204-1 via mobile service provider 206. For example, such a first quality of service may be provided to those applications that are determined to be tethered and are associated with the service subscription. In such an example, those who pay a subscription to make tethering a reliable feature might not be subject to general deactivation but may still be subject to overall quality of service policies.

Figure 4:
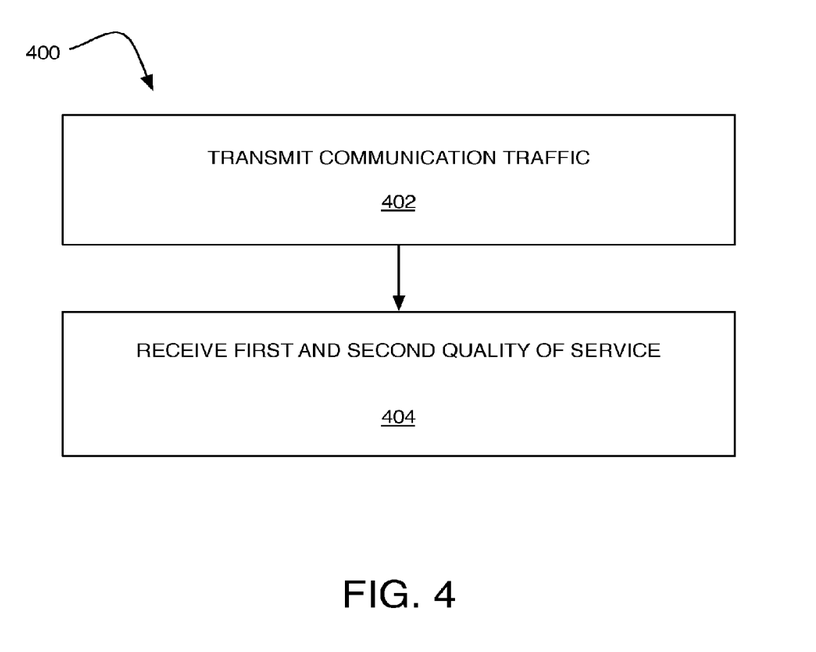
FIG. 4 illustrates a further example process for adjusting the quality of service on an application-by-application basis based at least in part on a plurality of network addresses associated with a given mobile device that is arranged in accordance with at least some embodiments of the present disclosure.

Processing may continue from operation 312 to operation 314, "provide a second quality of service", where a second quality of service may be provided to mobile device 204-1 via mobile service provider 206. For example, such a second quality of service may be provided to those applications that are determined to be tethered and not associated with the service subscription. In such an example, such a second quality of service may include throttling the quality of service to mobile device 204-1 on an application-by-application basis (e.g., where such applications may be differentiated via a plurality of network addresses), shutting down the quality of service to mobile device 204-1 on an application-by-application basis, the like, and/or combinations thereof. For example, the specific connection belonging to the tethering application may be reduced to zero bandwidth. While the operations of process 300 have been illustrated with respect to tethering policies, other policies can of course be used here as process 300 (as well as process 100 and/or 400) may allow address-level control (e.g., on an application-by-application basis) based on criteria other than and/or in addition to tethering. For example, such other policies regarding throttling or shutting down the quality of service may include traffic engineering policies, Quality of Service policies, application health diagnosis policies, further policies related to network conditions, the like, and/or combinations thereof.

Additionally or alternatively, a third quality of service may optionally be provided. For example, a third quality of service may optionally be provided to those applications that are not determined to be tethered. In other examples, the first quality of service may be provided to those applications that are not determined to be tethered as well as to those applications that are determined to be tethered and are associated with the service subscription.

Processing may continue from operation 314 to operation 316, "transmit message", where a message may be transmitted to mobile device 204-1 via mobile service provider 206. For example, such a message may be transmitted to mobile device 204-1 via mobile service provider 206 based at least in part on a determination that an application is tethered. Similarly, such a message may be transmitted to mobile device 204-1 via mobile service provider 206 based at least in part on a determination that a service subscription is not associated with those applications that are determined to be tethered. In such examples, the message may indicate that the quality of service to those applications that are determined to be tethered (and/or that a service subscription is not associated with those applications) have been adjusted.

For example, operation 316 may be utilized to correctly distinguish between lost connections and congestion events so that a user of mobile device 204-1 can be properly informed of the affects on quality of service. For example, mobile device 204-1 itself may still have a connection to mobile service provider 206 when tethering is deactivated, so the tethering application can request network connection status outside of its limited data connection in order to recognize and report information such as: "Free tethering has been temporarily reduced due to heavy network traffic, for a subscription call 1-800-NNN-NNNN". Accordingly, a service subscription may be added to restore quality of service after receipt of such a message regarding quality of service adjustment.

In operation, process 300 may include an admission policy in which tethering is allowed in two or more tiers by isolating the tethering applications from others. In some examples, mobile device 204-1 may have free use of tethering when shared network resources are in surplus (and thus operator costs and capabilities are not impacted) while only those paying for an enhanced tethering capability may have access during times of congestion. This approach allows most mobile devices to use tethering casually most of the time, enhancing customer satisfaction, while encouraging those who may depend on consistent tethering to purchase a subscription in advance or risk not having access. Accordingly, process 300 may allow mobile device 204-1 to surf the web while not enabling use of that same data capability for tethering to another device during congestion, so the deactivation of tethering must be done at the address level. In general, some or all of the operations described above with respect to process 300 may be extended to any address-level quality of service in addition to or in the alternative to traffic-type quality of service.

As discussed above, tethered applications may be identified in some embodiments via Host Identity Protocol-type identifiers. For example, such Host Identity Protocol implementations may be utilized as a standardized way of assigning multiple addresses to a single physical mobile device (e.g., mobile device 204-1). Such a Host Identity Protocol standard may allow application level end-points (e.g., sockets) to have unique identifiers such as Internet Protocol version 4 (IPv4) and/or Internet Protocol version 6 (IPv6) network addresses. Mobile service provider 206 may treat such unique first and second network addresses alike, as both share the same topological location, while each of the first and second network addresses may be associated with a full set of ports, security, and/or sessions. Thus process 300 may assign a tethering application a different Host Identity Protocol-type identifier than the rest of the web service-type applications on the mobile device. As a result of this assignment, mobile service provider 206 may see a different and known network address for tasks associated with a tethering application and is able to shut down or scale tethering quality of service separately from tasks associated with a non-tethering application. Meanwhile, the tasks associated with a tethering application may still have a full set of ports and be indistinguishable from a normal connection associated with a non-tethering application.

While the Host Identity Protocol (HIP) is an existing standard, HIP is often identified as not being suitable for quality of service management. For example, quality of service support has been identified as problematic in HIP, because HIP does not provide a flow assignment mechanism to different network interfaces. More specifically, quality of service support has been identified as problematic in HIP, as HIP does not allow quality of service based on traffic type. Accordingly, without traffic type differentiation (e.g., video and text traffic types), HIP does not allow quality of service to be based on traffic type. Accordingly, HIP is often identified as not being suitable for quality of service management based on the inability of HIP for use in separating different traffic types within a single HIP link. Conversely, process 300 (as well as the processes described in FIG. 1 and/or FIG. 4, for example) may use HIP to divide up applications into separate HIP links, which quality of service related network elements may effectively handle. Accordingly, process 300 (as well as the processes described in FIG. 1 and/or FIG. 4) may use HIP for quality of service management by focusing on address-based control of traffic for network operators (e.g., since the application will show a different network address in headers) instead of or in addition to traffic-type-based control of traffic. For example, process 300 may use HIP for throttling or blocking the entire tethering application whenever there is congestion, as opposed to generally affecting a particular type of traffic (e.g., video and text traffic types).

FIG. 4 illustrates a further example process for adjusting the quality of service on an application-by-application basis based at least in part on a plurality of network addresses associated with a given mobile device that is arranged in accordance with at least some embodiments of the present disclosure. Process 400 may include one or more of functional operations as indicated by example operations 402 and/or 404.

As illustrated, process 400 may be implemented for adjusting the quality of service on an application-by-application basis based at least in part on a plurality of network addresses associated with a given mobile device. Process 400 may be implemented in a communication network associated with a plurality of mobile devices (see FIG. 2). Processing may begin at operation 402, "transmit communication traffic", where communication traffic may be transmitted to a mobile service provider. For example, communication traffic may be transmitted to a mobile service provider portion of the communication network from a given mobile device of the plurality of mobile devices. The communications traffic may include communications traffic from a first application associated with a first network address and a second application associated with a second network address. For example, the mobile service provider may associate the first and second network addresses with the first and second applications of mobile device, respectively.

Processing may continue from operation 402 to operation 404, "receive first and second quality of service", where a first and second quality of service may be received from the mobile service provider. For example, the mobile device may receive a first quality of service for the first application and a different second quality of service for the second application from the mobile service provider. In some examples, the first and second quality of service may be based at least in part on the first and second network addresses. For example, the first and second quality of service may be based at least in part on a ranking of the first and second network addresses as well as network conditions of the communication network.

Figure 5:
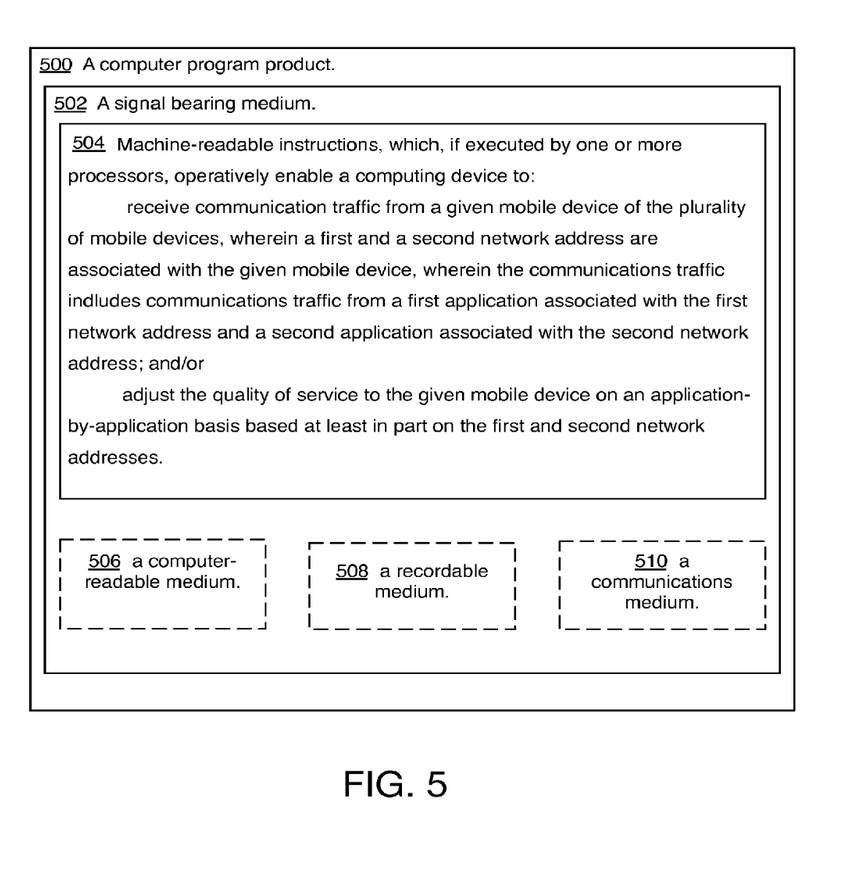
FIG. 5 is a block diagram of an illustrative embodiment of a computing device arranged in accordance with at least some embodiments of the present disclosure.

FIG. 5 illustrates an example computer program product 500 that is arranged in accordance with at least some examples of the present disclosure. Program product 500 may include a signal bearing medium 502. Signal bearing medium 502 may include one or more machine-readable instructions 504, which, if executed by one or more processors, may operatively enable a computing device to provide the functionality described above with respect to FIG. 1, FIG. 3, and/or FIG. 4. Thus, for example, referring to the system of FIG. 2 one or more mobile devices 204 and/or mobile service providers 206 may undertake one or more of the actions shown in FIG. 1, FIG. 3, and/or FIG. 4 in response to instructions 504 conveyed by medium 502.

In some implementations, signal bearing medium 502 may encompass a non-transitory computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass communications medium 510, such as, but not limited to, a digital and/or an analog communication medium (e.g., a fiber optic cable, a waveguide, a wired communications link, a wireless communication link, etc.).

Figure 6:
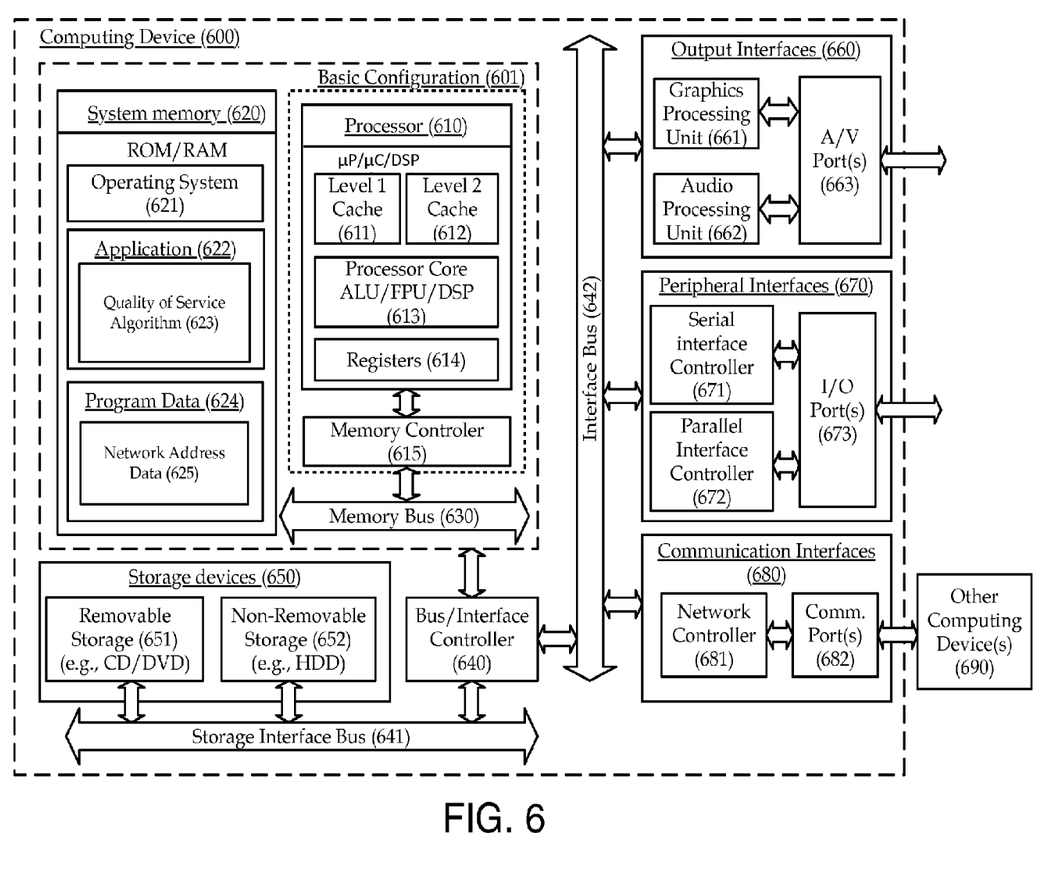
FIG. 6 is a schematic diagram of an illustrative embodiment of a computing device arranged in accordance with at least some embodiments of the present disclosure.

FIG. 6 is a block diagram illustrating an example computing device 600, such as might be embodied by a person skilled in the art, which is arranged in accordance with at least some embodiments of the present disclosure. In one example configuration 601, computing device 600 may include one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one or more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a quality of service algorithm 623 in a communication network that is arranged to perform the functions as described herein including the functional blocks and/or actions described with respect to process 100 of FIG. 1, process 300 of FIG. 3, and/or process 400 of FIG. 4. Program Data 624 may include network address data 625 for use with quality of service algorithm 623. In some example embodiments, application 622 may be arranged to operate with program data 624 on an operating system 621 such that implementations of adjusting the quality of service on an application-by-application basis based at least network addresses in communication networks may be provided as described herein. For example, one or more mobile devices 204 and/or mobile service providers 206 may comprise all or a portion of computing device 600 and be capable of performing all or a portion of application 622 such that implementations of adjusting the quality of service on an application-by-application basis based at least network addresses in communication networks may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 660 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method implemented in a communication network, comprising:
   receiving, via a mobile service provider of the communication network, communication traffic from a mobile device, wherein a first network address and a second network address are associated with the mobile device, wherein the communication traffic includes communication traffic of a first application associated with the first network address and a second application associated with the second network address;
   determining, via the mobile service provider, that the second application tethers the mobile device and an additional mobile device such that Internet access is provided, via the mobile device, to the additional mobile device;

determining, via the mobile service provider, that the second application is not associated with a service subscription and the first application is associated with the service subscription; and in response to the determining, adjusting, via the mobile service provider, an existing quality of service to the mobile device on an application-by-application basis, including assigning a first quality of service to the first application and assigning a second quality of service to the second application based at least in part on the first network address and the second network address.

2. The method of claim 1, wherein the adjusting of the existing quality of service to the mobile device on an application-by-application basis is based at least in part on a ranking of the first and second network addresses as well as network conditions of the communication network.

3. The method of claim 2, wherein the network conditions comprise one of traffic congestion and a given time period.

4. The method of claim 1, wherein the communication traffic of the first and second applications is communicated via a single physical layer connection between the mobile device and the mobile service provider of the communication network.

5. The method of claim 1, wherein the adjusting of the existing quality of service to the mobile device on an application-by-application basis comprises throttling the existing quality of service to the mobile device on an application-by-application basis.

6. The method of claim 1, wherein the adjusting of the quality of service to the mobile device on an application-by-application basis comprises shutting down the quality of service to the mobile device on an application-by-application basis.

7. The method of claim 1, wherein the first and second network addresses comprise Host Identity Protocol-type identifiers.

8. The method of claim 1, wherein the first and second qualities of service are different from each other.

9. The method of claim 1, further comprising:
transmitting, via the mobile service provider, a message to the mobile device based at least in part on the determination that the service subscription is not associated with the second application, wherein the message indicates that a quality of service assigned to the second application.

10. A mobile service apparatus, comprising:
a mobile service provider configured to facilitate communication in a communication network, the mobile service provider configured to:
receive communication traffic from a mobile device, wherein a first network address and a second network address are associated with the mobile device, wherein the communication traffic includes communication traffic of a first application associated with the first network address and a second application associated with the second network address;
determine, via the mobile service provider, that the second application tethers the mobile device and an additional mobile device such that Internet access is provided, via the mobile device, to the additional mobile device; and
in response to the determining, adjust an existing quality of service to the mobile device on an application-by-application basis, including assigning a first quality of service to the first application and assigning a second quality of service to the second application based at least in part on the network address of the one of the first and second applications,
wherein the second application is not associated with a service subscription, and the first application is associated with the service subscription.

11. The mobile service apparatus of claim 10, wherein to adjust the existing quality of service is based at least in part on a ranking of the first and second network addresses as well as network conditions of the communication network.

12. The mobile service apparatus of claim 10, wherein communication traffic of the first and second applications is communicated via a single physical layer connection between the mobile device and the mobile service provider.

13. The mobile service apparatus of claim 10, wherein the first and second qualities of service are different from each other.

14. The mobile service apparatus of claim 10, wherein the mobile service provider is further configured to:
transmit a message to the mobile device based at least in part on a determination that the service subscription is not associated with the second application, wherein the message indicates that a quality of service assigned to the second application.

15. An article comprising:
a non-transitory computer-readable medium comprising machine-readable instructions stored thereon, which, if executed by one or more processors, operatively enable a computing device to:
receive communication traffic from a mobile device, wherein a first network address and a second network address are associated with the mobile device, wherein the communication traffic includes communication traffic of a first application associated with the first network address and a second application associated with the second network address;
determine, via a mobile service provider of a communication network, that the second application tethers the mobile device and an additional mobile device such that Internet access is provided, via the mobile device, to the additional mobile device; and
in response to the determining, adjust an existing quality of service to the mobile device on an application-by-application basis, including assigning a first quality of service to the first application and assigning a second quality of service to the second application based at least in part on the network address of the one of the first and second applications,
wherein the second application is not associated with a service subscription, and the first application is associated with the service subscription.

16. The article of claim 15, wherein to adjust the existing quality of service is based at least in part on a ranking of the first and second network addresses as well as network conditions of the communication network.

17. A method implemented in a processing component of a communication network, comprising:
receiving, from a wireless device, wireless communication traffic from first and second network addresses that are both associated with the wireless device, wherein the wireless communication traffic includes wireless communication traffic of a first application associated with the first network address and a second application associated with the second network address;
processing to identify the first and second network addresses from headers in the wireless communication traffic;

processing to identify the second network address as being associated with a device that is tethered to the wireless device; and using the identified first and second network addresses, processing to dynamically provide a first quality of service for the first application by its association with the first network address and a second quality of service for the second application by its association with the second network address, including adjusting at least the first quality of service responsive to the identifying of its network address, wherein the second application is not associated with a service subscription, and the first application is associated with the service subscription.

18. The method of claim 17, further comprising:

reducing the second quality of service, including throttling or shutting down service provided for the second application.

* * * * *

UNITED STATES PATENT AND TRADEMARK OFFICE
CERTIFICATE OF CORRECTION

PATENT NO.       : 8,812,681 B2                                Page 1 of 1
APPLICATION NO.  : 13/262825
DATED            : August 19, 2014
INVENTOR(S)      : Kruglick It is certified that error appears in the above-identified patent and that said Letters Patent is hereby corrected as shown below:

Title Page, Item (74), under "Attorney, Agent, or Firm", in Column 2, Line 1, delete "Brundidge & Strange, P.C." and insert -- Brundidge & Stanger, P.C. --, therefor.

Signed and Sealed this
Second Day of June, 2015

Michelle K. Lee
*Director of the United States Patent and Trademark Office*